United States Patent [19]

Liautaud

[11] 3,998,240

[45] Dec. 21, 1976

[54] INJECTION-MOLDED FAUCET ASSEMBLY

[76] Inventor: James P. Liautaud, River and Bluff Roads, Trout Valley, Cary, Ill. 60013

[22] Filed: June 13, 1975

[21] Appl. No.: 586,720

[52] U.S. Cl. .............................. 137/375; 137/606; 251/366

[51] Int. Cl.$^2$ .............................. F16K 19/00

[58] Field of Search .......... 137/375, 606; 251/366; 264/271

[56] References Cited

UNITED STATES PATENTS

| | | | |
|---|---|---|---|
| 2,200,091 | 5/1940 | Kovach | 137/375 X |
| 2,219,471 | 10/1940 | Davis | 137/375 |
| 2,548,933 | 4/1951 | Barnett | 137/606 X |
| 3,402,731 | 9/1968 | Martin | 137/375 |
| 3,520,325 | 7/1970 | Stuart | 137/375 |

*Primary Examiner*—Robert G. Nilson
*Attorney, Agent, or Firm*—Lockwood, Dewey, Zickert & Alex

[57] ABSTRACT

A low profile faucet assembly of the type having hot and cold water valves and a spout includes an injection-molded body defining inlets for connection to hot and cold water pipes, an outlet for communication to the spout, and means for mounting the valves. Fluid communication is established within the body by means of an embedded central core member having a plurality of longitudinally extending passageways connected to the inlets and outlet by apertures axially aligned with the openings. The use of multiple passageways within the core reduces the knocking effects of low hoop strength, and the side-by-side arrangement of these passageways in a horizontal plane allows a low profile to be obtained. The use of threaded metal sleeves embedded in the inlets allows hot and cold water pipes to be connected directly to the faucet.

15 Claims, 6 Drawing Figures

INJECTION-MOLDED FAUCET ASSEMBLY

BACKGROUND OF THE INVENTION

This invention relates generally to water faucet assemblies, and more particularly to an improved injection-molded plastic body for a faucet assembly which is economical to manufacture, pleasing in design and silent in operation.

Faucet assemblies of the type commonly utilized with sinks in kitchens and bathrooms usually include a housing in which hot and cold water control valves are mounted together with metal or plastic piping and fittings for forming a flow path from the hot and cold water valves to an outlet spigot or spout extending from the faucet assembly. The piping, fittings and valves are commonly mounted within the housing, the control stems for the valves extending through the housing for adjustment by a user.

This type of construction, because of the need to separately form and assemble the various components, is unnecessarily costly to manufacture. Attempts at reducing the cost by forming the entire assembly from a single mold have heretofore not been satisfactory primarily because of the difficulty of economically forming interior passageways of sufficient size and strength within the mold while maintaining a smooth exterior surface.

Prior art valve assemblies have also had an unnecessarily high profile, primarily because of the internal passageways, which have had to be circular in cross section to employ standard piping. This has been a significant disadvantage in those applications requiring a faucet assembly having minimum height above the sink for reasons of aesthetics and practicality. Such assemblies have also been undesirably subject to knocking, a phenomenon resulting from changes in hoop stress, or internal pressure, exerted by the water on the walls of the passageways as the valves are closed or partially closed.

Accordingly, it is a general object of the present invention to provide a new and improved faucet assembly.

It is another object of the present invention to provide a new and improved body for a faucet assembly which is more economical to manufacture.

It is a further object of the present invention to provide a new and improved injection-molded body assembly for a faucet which has a low profile.

It is a further object of the present invention to provide an injection-molded body assembly for a faucet which is less subject to knocking with changes in water flow rates.

SUMMARY OF THE INVENTION

The invention is directed, in a faucet assembly of the type including at least one fluid inlet, a fluid outlet, and means for mounting at least one flow control valve in a position between the inlet and the outlet for controlling the flow therethrough to the improvement comprising a faucet body assembly providing a low profile body structure above a sink to which it is mounted, the body assembly including an elongated central core including at least one passageway extending the length thereof positioned between and in fluid communication with the inlet and the outlet, and an overmold in which the core is embedded and in which the inlet, the outlet, and the flow control valve mounting means are defined.

The invention is further directed to a body assembly for a faucet comprising a thin elongated core member, having at least one passageway extending lengthwise therein, an outlet aperture extending through the core member perpendicularly to the passageway and in communication therewith, at least one inlet aperture extending through the core member perpendicularly to the passageway and in communication therewith, and a plastic overmold, the core member being embedded therein, the overmold including an inlet portion axially aligned and in fluid communication with the inlet aperture in the core member, and an outlet portion axially aligned in fluid communication with the outlet aperture in the core member.

The invention is further directed, in a water faucet assembly of the type having a housing, at least one inlet in the housing, a flow control valve mounted in the inlet, an outlet in the housing, and means for coupling an inlet pipe to the inlet, to the improvement wherein the housing is made of molded plastic and the inlet and the outlet are defined therein, and wherein liquid communication is established between the inlet and the outlet by means of an elongated core member embedded in the housing, the core member having a plurality of longitudinally extending passageways therethrough positioned between and in fluid communication with the inlet and the outlet.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures in which like reference numerals identify like elements and in which:

DESCRIPTION OF THE PREFERRED EMBODIMENT

Figure 1:
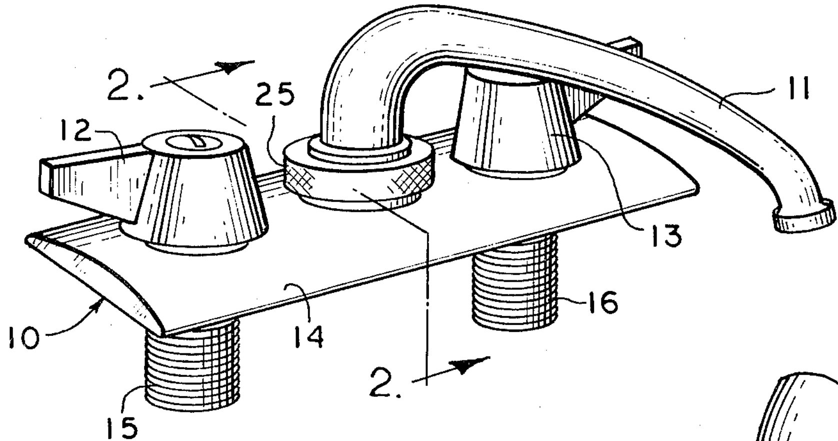
FIG. 1 is a perspective view of an injection-molded plastic faucet assembly constructed in accordance with the present invention.

Referring now to the drawings, and particularly to FIG. 1, there is shown a faucet assembly 10 including a central pour spout 11, a pair of handles 12 and 13 for controlling the flow of hot and cold water through the spout, and an injection-molded body assembly 14 which includes a pair of externally-threaded downwardly-projecting inlets 15 and 16 for coupling to external hot and cold water sources, respectively.

Figure 2:
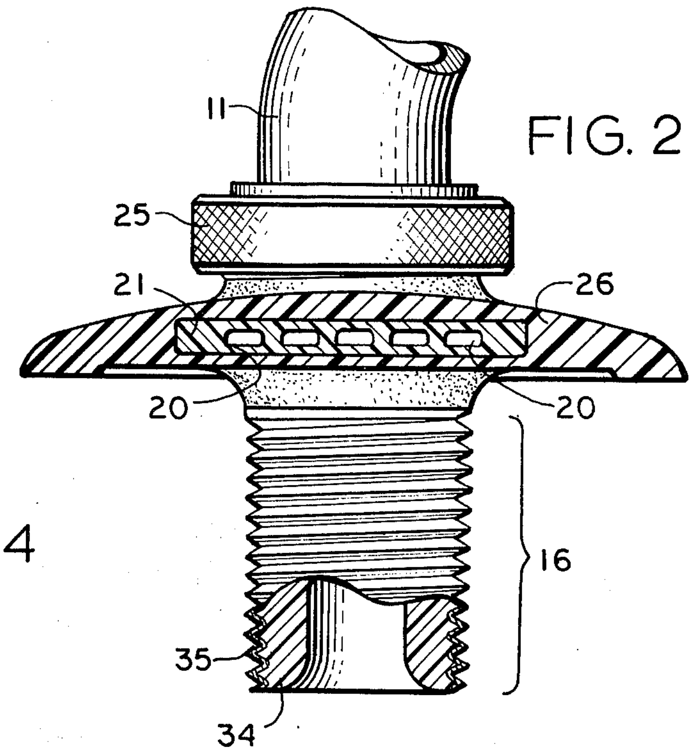
FIG. 2 is an enlarged cross sectional view taken along line 2—2 of FIG. 1.
Figure 4:
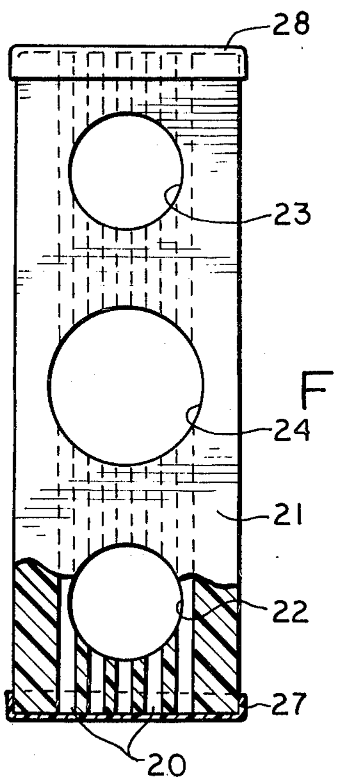
FIG. 4 is a top elevational view, partially in section, of the central core member showing the longitudinal passageways contained therein and the end caps therefor.
Figure 3:
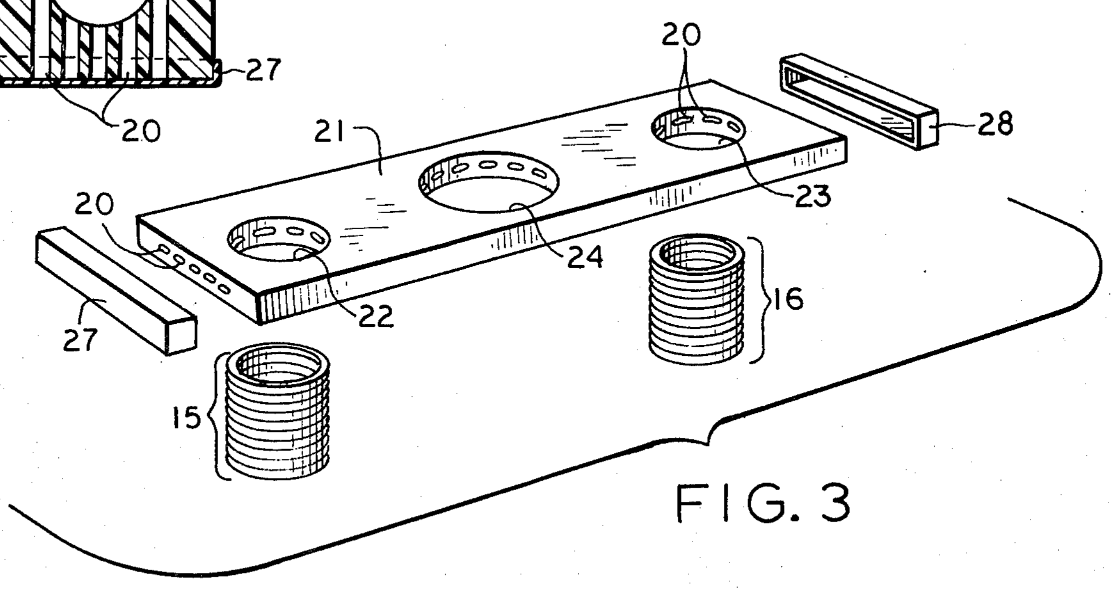
FIG. 3 is an exploded perspective view of an extruded central core member embedded in the faucet body together with end seals and a pair of metallic sleeves for connecting inlet pipes to the faucet.
Figure 5:
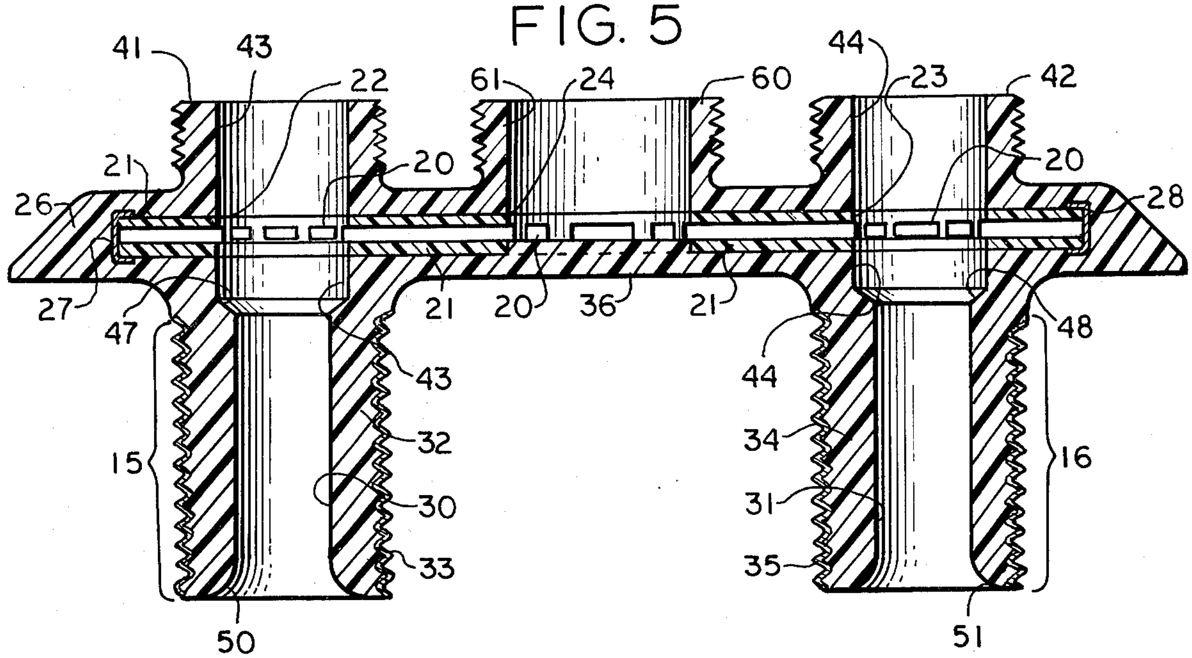
FIG. 5 is a side elevational view shown in section of the faucet body assembly showing the extruded central member and the inlet sleeves embedded therein.

Referring to FIG. 2, fluid communication is established between inlets 15 and 16 and spout 11 by means of a plurality of internal passageways 20 which extend substantially the entire length of body assembly 14. In accordance with one aspect of the invention, these passageways are formed by means of a thin extruded bar-shaped central core 21 which is embedded in the body assembly 14. Core 21 may be formed of an extrudable metallic material such as brass or copper, or from a hard extrudable plastic material. As shown in FIGS. 3–5, the core preferably has flat top and bottom surfaces, passageways 20 being arranged side-by-side in parallel-spaced relationship through the entire length of the core. Fluid communication is established between these passageways and inlets 15 and 16 by means of first and second apertures 22 and 23 which extend vertically through the core perpendicular to the passageways and in axial alignment with respective ones of the inlets. Fluid communication is established between passageways 20 and spout 11 by means of a third aperture 24 axially aligned with the base of the spout, which is rotatably mounted to the faucet body by means of a collar bearing assembly 25 (FIG. 2). Since the apertures 22 and 23 establish communication between inlets 15 and 16 and passageways 20, and since aperture 24 establishes communication between passageways 20 and spout 11, water entering inlets 15 and 16 is discharged through spout 11.

Passageways 20, of which there are five positioned side-by-side in this embodiment, are formed by a conventional manner during manufacture of the extrusion from which the core is made by placing mandrels of a desired shape in the cavity in which the extrusion is formed. Although round passageways having a uniform cross section along the entire length of the central core are shown, it will be appreciated that passageways having other cross sections, such as rectangular or oval cross sections, could be provided instead.

The side-by-side arrangement of the passageways enables the core 21 to be dimensioned with relatively wide and flat top and bottom surfaces, and relative thin side surfaces. The thinness of the core enables the faucet body assembly 14 to have a small vertical dimension, which, as previously mentioned, is desirable in many applications.

Although fluid communication can be established through the core while maintaining a low vertical profile by utilizing a single widened passageway instead of a plurality of passageways, the use of multiple passageways is preferred because the effects of hoop stress, i.e. the force exerted on the passageway side walls by changes in fluid flow pressure, are reduced. The reduction in hoop stress lessens the tendency of the faucet to knock or vibrate when a faucet is closed or partially closed.

The central core member 21 is embedded in a plastic overmold 26, which may be formed in any desired color with a smooth aesthetically pleasing exterior surface. To prevent plastic material from entering passageways 20 during formation of the overmold, end caps 27 and 28 may be placed over the ends of core 21 to close off the ends of passageways 20. End caps 27 and 28 are, in this embodiment, rectangular in form and include a rectangular recess for receiving the ends of the central core 21. Plastic material is prevented from entering passageways 20 through apertures 22–24 by appropriately dimensioned, removable cores (not shown) which are placed in the mold in which the body assembly 14 is formed during the forming process.

Referring to FIG. 5, inlets 15 and 16, which include passageways 30 and 31, are also formed during the molding operation by means of removable cores. A first core (not shown) may be utilized to form passageway 30, the mold providing for the formation of an annular downwardly projecting side wall portion 32. A threaded sleeve 33 preferably formed of ductile metal such as brass, copper or the like, may be molded into the surface of the wall portion 32 to receive on its threaded external surface a complementarily threaded pipe or connecting fitting. The sleeve is retained tightly in position by reason of the corrugated form of sleeve 33, the crowns of the threads on the inside surface of the sleeve 33 being embedded in the outside surface of side wall portion 32. Inlet 16 is similarly formed and structured, having a downwardly projecting side wall portion 34 and a threaded sleeve portion 35. Although sleeves 35 and 36 are shown molded onto the outside surfaces of side wall portions 32 and 34, it will be appreciated that these sleeves may also be molded into the inside surfaces of the side wall portions in appropriate applications, the external threaded surfaces of the sleeves then being embedded in the plastic overmold and the internal threaded surface receiving a complementarily threaded coupling or pipe.

As shown in FIG. 5, the faucet body assembly 14 includes the overmold portion 26, the extruded central core 21 embedded therein, end caps 27 and 28 mounted on the ends of the core, and threaded sleeves 33 and 35 embedded in the annular side wall portions 32 and 34 of overmold 26. Overmold 26 includes a central generally horizontal portion which covers the central core member 21, and has a flat bottom surface 36 for flush contact with the top surface of a sink 40 (FIG. 6) on which the faucet may be mounted. Bottom surface 36 may be interiorly dished as shown in FIG. 2 to save on material use. The top surface of the overmold may have any desired shape, in the illustrated embodiment being convex (FIG. 2) with relatively flat sloped end surfaces.

The remaining portions of overmold 26 are functional in nature, providing for the attachment of structures to the faucet body assembly 14. In this embodiment all the mountings project upwardly from the central portion of the overmold. The mountings include a pair of annular valve mounting portions 41 and 42 having valve apertures 43 and 44, axially aligned with apertures 22 and 23 and inlet passageways 30 and 31, respectively. The outer surfaces of these valve mounting portions are threaded to receive a conventional collar bearing assembly 45 (FIG. 6) associated with each valve. The top surfaces of these valve mounting portions are flat to receive a washer 46 (FIG. 6) associated with each valve. Apertures 43 and 44 are cylindrical and of the same diameter as apertures 22 and 23 in central core 21, which form a continuing portion of each valve aperture. The lower ends of valve apertures 43 and 44 include frusto-conical seating surfaces 47 and 48, the upper and widest edges of which are defined by valve apertures 43 and 44, and the narrowest and lowest edges of which are defined by inlet apertures 30 and 31. The bottom edge of the inlet side wall portions 32 and 34 of overmold 26 may be inwardly rounded at their inner edges 50 and 51 to form a sealing surface against which the ball-type sealing surface 52 (FIG. 6) of a flairless fitting 53 may bear to form a water tight seal with a connecting conduit 54.

A spout mounting portion 60, having a central discharge passageway 61 axially aligned with, and of the same diameter as, aperture 24, projects upwardly from the top surface of the central portion of overmold 26. Threads on the outer surface of this projection provide means for securing a mounting sleeve 26 (FIG. 6) thereto which retains the spout 11 in position. In the complete faucet assembly 10, an O-ring 63 may be provided in an annular groove 64 about the periphery of the spout, together with a pair of washers 65 and 66, to maintain a water tight rotatable seal between the valve body assembly 14 and spout 11.

Figure 6:
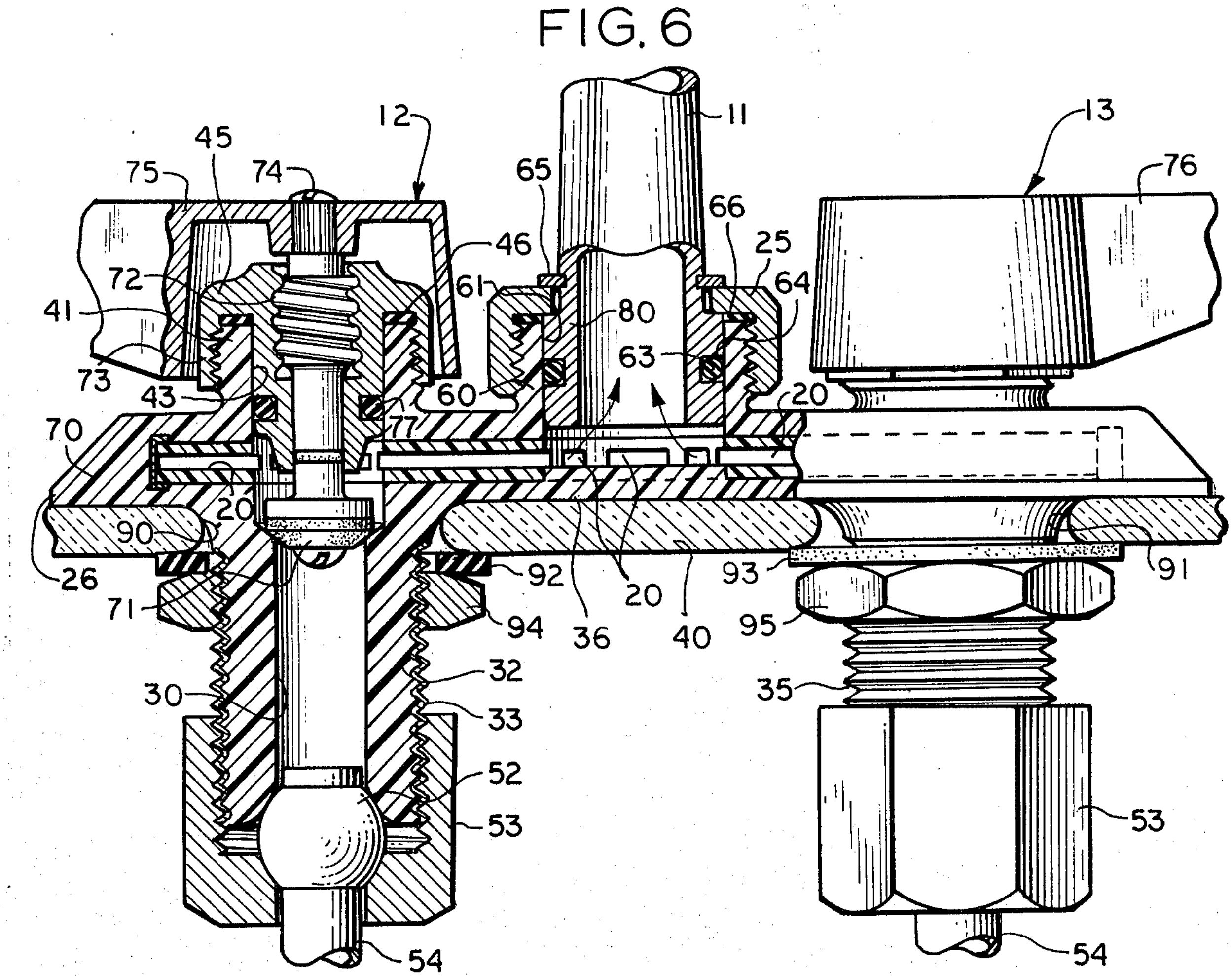
FIG. 6 is a side elevational view, partially in section, of a complete faucet assembly incorporating the body assembly of FIG. 5.

Referring to FIG. 6, a complete faucet assembly 10 includes, in addition to the valve body assembly 14, shown in FIG. 5, water flow control valves 12 and 13 and spout 11, which may be conventional in design and construction. Each valve includes a valve stem 70 having an enlarged frusto-conical sealing surface 71 at its bottom end which bears against the valve seat surfaces 47 and 48 provided in the valve body assembly 14 to restrict the flow of water through passageways 43 and 44, respectively. The valve stems include a threaded portion 72 which is matingly engaged to threads on a valve pack or body member 73, which in turn is threadedly secured to the externally threaded valve mounting portions 41 and 42 of overmold 26. At its upper end the valve stems 70 are connected by machine screws 74 to respective ones of control handles 75 and 76 such that turning the handles brings the frusto-conical portion 71 of the valve stem 70 into and out of sealing engagement with the valve seat surfaces in the valve body assembly 14. An O-ring 77 may be provided in an annular groove about the circumference of valve stem 70 to assist in the sealing operation.

Spout 11 has at its bottom end an annular mounting portion 80 which is sized so as to slidably fit into the discharge aperture 61 of the spout mounting portion 60. Mounting sleeve 25 is constructed for retaining shoulder engagement between it and mounting portion 80 of spout 11, and is threaded at its bottom inside surface to engage the threads of the spout mounting portion. The outer surface 84 of mounting sleeve 16 may be knurled for hand fitting, of hexagonal nut shape for wrench fitting, or of other like configuration.

Inlets 15 and 16 connect to inlet pipes or conduits 54 from hot and cold water supplies by means of fittings, these fittings including hexagonal sleeves 53 which are turned onto the threaded projecting portions 32 and 34. The entire valve assembly 10 is mounted to the sink 40 by positioning the inlet mounting portions 32 and 34 through apertures 90 and 91 in the sink top and securing those portions to the sink by means of washers 92 and 93 and retaining nuts 94 and 95, which are fully turned onto the threaded matallic sleeves 33 and 35, respectively.

While one embodiment of the invention has been shown and described, it will be obvious to those skilled in the art that changes and modifications may be made without departing from the invention in its broader aspects. For example, control of the mixing of hot and cold water can be performed by one central valve, and the threaded sleeves 33 and 35 can be positioned inside of the inlet mounting portions 32 and 34 instead of outside of these portions. Also, the valves and spout can be retained on their mountings by equivalent means other than threads. Therefore, the aim in the appended claims is to cover all such changes and modifications as fall within the true spirit and scope of the invention.

I claim:

1. In a water faucet assembly of the type having
   a housing;
   at least one inlet in said housing;
   a flow control valve mounted in said inlet;
   an outlet in said housing; and
   means for coupling an inlet pipe to said inlet;
   the improvement wherein
   said housing is made of molded plastic and said inlet and said outlet are defined therein, and wherein liquid communication is established between said inlet and said outlet by means of an elongated core member embedded in said housing, said core member having a plurality of longitudinally extending passageways therethrough positioned between and in fluid communication with said inlet and said outlet.

2. A faucet assembly as defined in claim 1 wherein said passageways are positioned in spaced parallel relationship in a single plane.

3. A faucet assembly as defined in claim 1 wherein said core member comprises an extrusion.

4. A faucet assembly as defined in claim 1 wherein said coupling means include a threaded metal sleeve at least partially embedded in said housing.

5. A faucet assembly as defined in claim 4 wherein said sleeve is corrugated in structure, and has threads at least partially embedded in said housing.

6. An injection-molded body assembly as defined in claim 1 which further includes means for covering said passageways at the ends of said core member for preventing plastic from entering therein during the forming of said overmold over said core member.

7. In a faucet assembly of the type including
   at least one fluid inlet,
   a fluid outlet, and
   means for mounting at least one flow control valve in a position between said inlet and said outlet for controlling the flow therethrough,
   the improvement comprising:
   a faucet body assembly providing a low profile body structure above a sink to which it is mounted, said body assembly including
   an overmold defining said inlet, outlet, and flow control valve mounting means; and
   means including an elongated core member embedded within said overmold for establishing fluid communication between said inlet and said outlet, said core having a plurality of passageways extending through said core between said inlet and said outlet in parallel spaced-apart relation for lowering hoop stress in said faucet assembly.

8. A faucet assembly as defined in claim 7 wherein said passageways are arranged in a parallel spaced-apart relationship.

9. A faucet assembly as defined in claim 8 wherein said passageways are arranged in a single plane.

10. A faucet assembly as defined in claim 7 wherein said core member comprises an extrusion.

11. A body assembly for a faucet comprising, in combination:
    a thin elongated core member having a plurality of passageways extending in spaced-apart relationship lengthwise therein;
    an outlet aperture extending through said core member perpendicularly to said passageways and in communication therewith;

at least one inlet aperture extending through said core member perpendicularly to said passageways and in communication therewith; and a plastic overmold, said core member being embedded therein, said overmold including an inlet portion axially aligned and in fluid communication with said inlet aperture in said core member, and an outlet portion axially aligned in fluid communication with said outlet aperture in said core member.

12. A faucet assembly as defined in claim 11 wherein said passageways are arranged in a parallel spaced-apart relationship.

13. A faucet assembly as defined in claim 12 wherein said passageways are arranged in a single plane.

14. A faucet assembly as defined in claim 12 wherein said core member comprises an extrusion.

15. A body assembly for a faucet as defined in claim 11 wherein means for covering said passageways at the ends of said core member are provided for preventing plastic from entering therein during the forming of said overmold over said core member.

* * * * *